United States Patent
Aritomi (10) Patent No.: US 7,533,355 B2
(45) Date of Patent: May 12, 2009

(54) INFORMATION PROCESSING APPARATUS, INFORMATION PROCESSING METHOD, AND CONTROL PROGRAM

(75) Inventor: Masanori Aritomi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 411 days.

(21) Appl. No.: 10/021,248

(22) Filed: Dec. 19, 2001

(65) Prior Publication Data
US 2002/0085047 A1 Jul. 4, 2002

(30) Foreign Application Priority Data
Dec. 28, 2000 (JP) .............................. 2000-401213

(51) Int. Cl.
*G06F 3/00* (2006.01)
(52) U.S. Cl. ........................ 715/853; 715/739; 715/738; 715/763; 709/201; 709/203
(58) Field of Classification Search ........................ None
See application file for complete search history.

(56) References Cited

U.S. PATENT DOCUMENTS

| | | | | |
|---|---|---|---|---|
| 5,353,399 A * | 10/1994 | Kuwamoto et al. | ......... | 715/736 |
| 5,838,319 A * | 11/1998 | Guzak et al. | ................ | 345/854 |
| 5,895,474 A * | 4/1999 | Maarek et al. | .............. | 715/514 |
| 6,003,040 A * | 12/1999 | Mital et al. | ............. | 707/103 R |
| 6,111,579 A * | 8/2000 | Alimpich et al. | ............ | 715/853 |
| 6,202,066 B1 * | 3/2001 | Barkley et al. | ................ | 707/9 |
| 6,266,693 B1 * | 7/2001 | Onaga | ........................ | 709/219 |
| 6,281,896 B1 * | 8/2001 | Alimpich et al. | ............ | 715/781 |
| 6,348,971 B2 * | 2/2002 | Owa et al. | ................. | 358/1.15 |
| 6,380,957 B1 * | 4/2002 | Banning | ..................... | 345/828 |
| 6,421,716 B1 * | 7/2002 | Eldridge et al. | ............. | 709/219 |
| 6,452,692 B1 * | 9/2002 | Yacoub | ..................... | 358/1.15 |
| 6,615,207 B1 * | 9/2003 | Lawrence | ....................... | 707/5 |
| 6,622,157 B1 * | 9/2003 | Heddaya et al. | ............. | 709/202 |
| 6,628,304 B2 * | 9/2003 | Mitchell et al. | ............. | 345/734 |
| 6,727,926 B1 * | 4/2004 | Utsuki et al. | ................. | 715/853 |
| 7,003,442 B1 * | 2/2006 | Tsuda | ............................ | 704/9 |
| 2001/0013053 A1 * | 8/2001 | Yamazaki | .................... | 709/203 |
| 2002/0002592 A1 * | 1/2002 | Aoki et al. | ................... | 709/211 |
| 2002/0078234 A1 * | 6/2002 | Makoto | ...................... | 709/238 |

FOREIGN PATENT DOCUMENTS

JP 11-232365 8/1999

OTHER PUBLICATIONS

Cowart, Robert "Mastering Windows 95—The Windows 95 Bible" 1995 Sybex Inc. p. 377.*
Faicheny, Jolon "Goldleaf Hierarchical Document Browser" 2001 IEEE.*
Windows NT, Screenshots, 1998, p. 1.*
McFedries, Paul, Windows 98 Unleashed, May 12, 1998, Sams, pp. 1-6 (attached).*

* cited by examiner

*Primary Examiner*—Stephen S Hong
*Assistant Examiner*—Ryan F Pitaro
(74) *Attorney, Agent, or Firm*—Fitzpatrick, Cella, Harper & Scinto (57) ABSTRACT

It is one objective of the present invention to provide a practical user interface that can considerably simplify the operations required for the display of a specific object desired by a user, and that can accurately display the specific device at an optimal order location for the user. To achieve this objective, a specific object is detected in directory information read from an external memory, and is displayed, using a tree structure, on a display device based on the steps along a directory path originating at a local object.

12 Claims, 7 Drawing Sheets

INFORMATION PROCESSING APPARATUS, INFORMATION PROCESSING METHOD, AND CONTROL PROGRAM

BACKGROUND OF THE INVENTION

1. Field of the Invention

The present invention relates to an information processing apparatus, such as a personal computer or a workstation that can install a driver for controlling various peripheral devices, an information processing method and a control program.

2. Related Background Art

Conventionally, for an information processing apparatus, such as a personal computer or a workstation, a specific folder, such as a printer folder, is opened and an additional icon is double-clicked on that executes a device installation function provided by an operating system (OS), so that a device (hereinafter each device type is called an object) that is used in common across a network, or that is locally connected, is installed by the operating system (OS). When an object to be installed is not available at a local machine (is not connected locally), a device that is connected across a network is searched for by referring to a reference dialogue, so that an object is specified and an installation instruction therefor is issued.

Generally, the list in a reference dialogue is displayed by sorting printers by name. Further, when a printer device that is locally connected to a PC other than a local machine is set so that it can be used in common, since the object of the common device is hidden under the PC icon, the tree structure must be traced down from the PC icon (hereinafter referred to as a PC object), before the object can be designated and an installation instruction issued therefor.

However, when the above user interface process is employed, the following problems, (1), (2) and (3), are encountered.

(1) A user must open and close many (+) controls for the PC object until the object, consisting of a desired printer device, is reached.

(2) Since the object list of the printer devices displayed is prepared by sorting the printer devices in alphabetic order, no consideration is given to the use frequencies thereof, and on a list, the rank assigned to a frequently employed object may be lower than other, less used objects.

(3) There is no difference in the display of access right levels, and frequently the access and release of the PC object is wasted.

SUMMARY OF THE INVENTION

To resolve the above shortcomings, it is one objective of the present invention to make available an information processing apparatus that provides a useful user interface, which is employed to detect a specific object in directory information read from a storage device, which controls an object display for the display, in accordance with a tree structure, of the specific object, as a preference, at a relatively upper position on a list, and for which, in order to select the preferred specific object and to correctly display that object at an appropriate relative position, the operations required of a user are simplified; and an information processing method and a storage medium therefor.

To achieve the above objective, according to one aspect of the present invention, an information processing apparatus is provided that is capable of communicating with a plurality of peripheral devices. That apparatus comprises a storage device, for storing predetermined objects for the peripheral devices based on directory information. Detection means detect a designated specific object in the directory information read from the storage device. Also provided are display means, for displaying, in accordance with a tree list, the specific object detected by the detection means, and control means, which, based on the number of steps along a directory path leading from a local object corresponding to one of the peripheral devices locally connected to the information processing apparatus to the specific object corresponding to another specific peripheral device, permit the display means to display, in accordance with the tree list, the specific object detected by the detection means.

According to another aspect of the invention, an information processing apparatus is provided that is capable of communicating with a plurality of peripheral devices, and that comprises a storage device, for storing predetermined objects for the peripheral devices based on directory information. There are provided detection means for detecting a specific designated object in the directory information read from the storage device. Display means are provided, for displaying, in accordance with a tree list, the specific object detected by the detection means, and control means that, when the detected object is to be displayed on the display means in accordance with a tree list, omit an intermediate directory path to the specific object. The control means permit the display means, based on the number of steps along a directory path leading from a local object corresponding to one of the peripheral devices locally connected to the information processing apparatus to the specific object corresponding to another specific peripheral device not locally connected to the information processing apparatus, to display, in accordance with the tree list, the specific object detected by the detection means.

According to still another aspect of the invention is provided an information processing apparatus having a search function, comprising a registration means, a display means and a search means. The registration means register a peripheral device in correspondence to a predetermined peripheral device folder. The display means display a search designation object for designating a search designation provided in correspondence to the peripheral device folder. The search means search for a peripheral device having a function corresponding to the search designation object designated by the designation means, and the display means display a search result obtained by the search means.

Other features and advantages of the present invention will become apparent during the following description given in conjunction with the accompanying drawings, throughout which like reference characters are used to designate the same parts or similar portions thereof.

DETAILED DESCRIPTION OF THE PREFERRED EMBODIMENT

Figure 1:
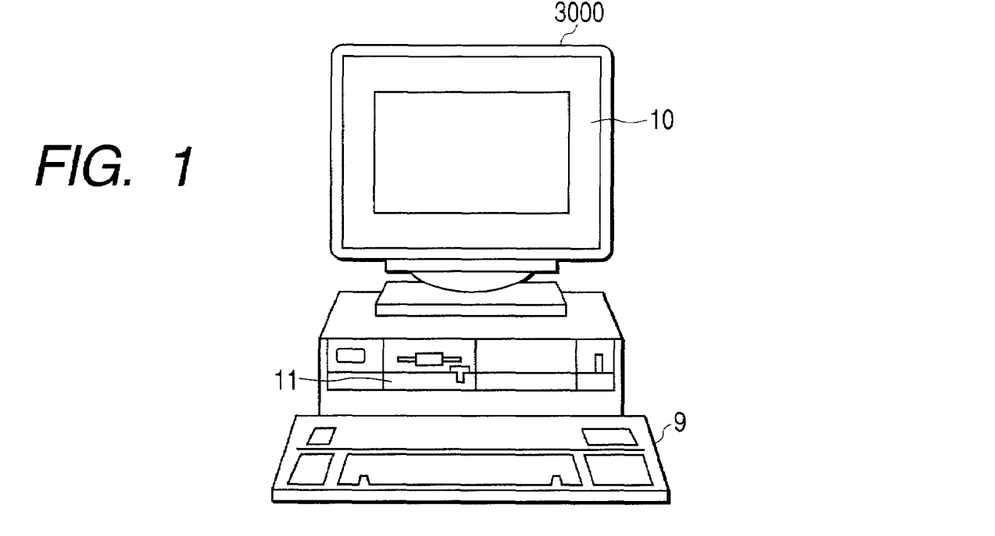
FIG. 1 is a diagram showing an overview of an information processing apparatus according to the present invention.

FIG. 1 is a diagram showing an overview of an information processing apparatus according to the present invention.

In FIG. 1, an information processing apparatus 3000, such as a personal computer, is an appropriate apparatus that can perform a rapid, continuous determination process. The information processing apparatus 3000 includes a keyboard 9 for receiving user input and a CRT 10 for displaying information for the user.

The information processing apparatus 3000 comprises: an external memory 11, for driving a removable storage medium, such as a magnetic disk (a floppy disk (FD) or a hard disk (HD)), a magneto-optical disk (MO), an optical disk (a CD-ROM, a CD-R or a CD-RW) or a digital video disk (a DVD-ROM or a DVD-RAM).

Figure 2:
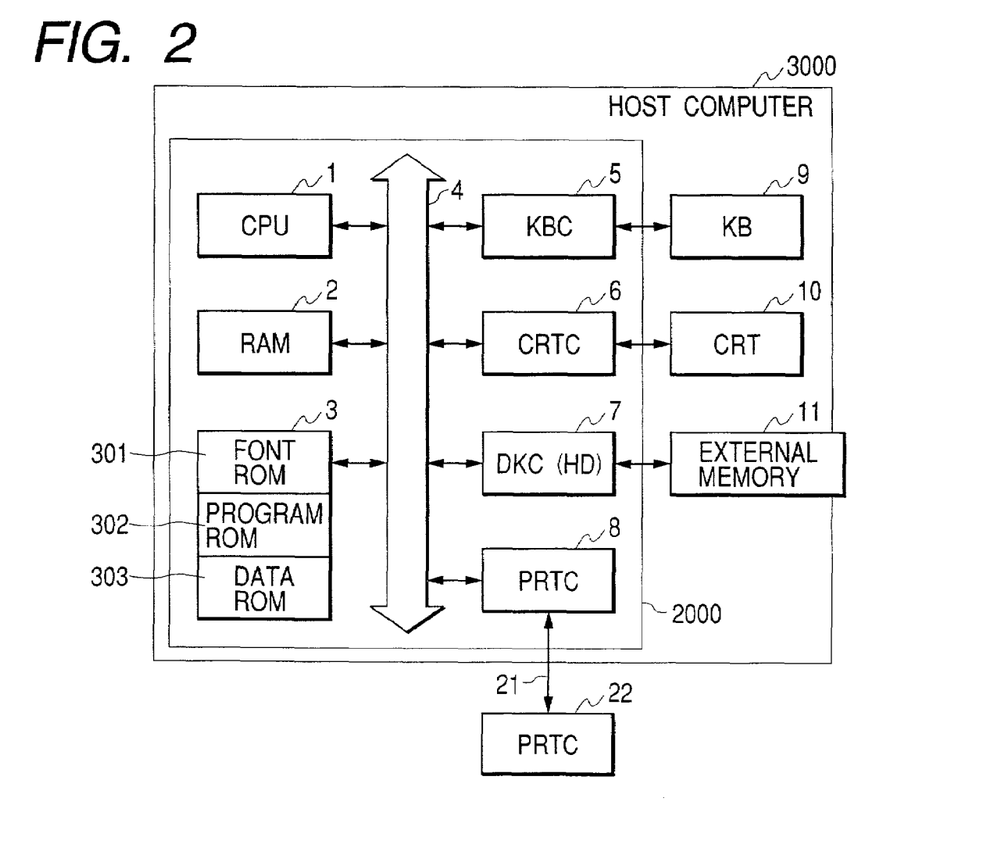
FIG. 2 is a block diagram for explaining the configuration of the information processing apparatus according to the present invention.

FIG. 2 is a block diagram for explaining the configuration of the information processing apparatus of the invention, and the same reference numerals as are used in FIG. 1 are used to denote corresponding components.

In FIG. 2, by using a RAM 2 as a work memory, a CPU 1, which is a microprocessor, processes a document wherein graphics, images, characters and tables (including spreadsheets) coexist, based on a program and data that are stored on a storage medium in the external memory 11, and totally controls a device, which will be described later, by using a system device 4.

A program executed by the CPU 1, such as the one shown in a flowchart that will be described later, is stored in a ROM area 302 in a ROM 3 or on a storage medium in the external memory 11.

Font data is stored in a ROM area 301 in the ROM 3 to generate a character pattern, with which, during the document process, characters and symbols in character data are created or edited, that is displayed on a CRT display (CRT) 10.

Various data used for the document process and the display process, such as the directory information in the ROM 3 and in an application table, are stored in a ROM area 303 in the ROM 3.

A keyboard controller (KBC) 5 controls entries made using the keyboard (KB) 9 or a pointing device (not shown), such as a mouse; and a CRT controller (CRTC) 6 controls the display on the CRT 10.

A disk controller (DKC) 7 controls access to the HD and the external memory 11, and reads and writes various programs and various data, such as font data, a user file and an edited file, related to the storage medium. A printer controller (PRTC) 8 is connected to a printer 22, via a predetermined bidirectional interface 21, and communicates with the printer 22. The CPU 1 expands (rasterizes) the outline font used for the display information area allocated for the RAM 2, or a special video memory (VRAM), and enables a WYSIWG display on the CRT 10. Based on commands entered using the mouse cursor displayed on the CRT 10, the CPU 1 opens various registered windows and performs various data processes.

Before the installation process using the thus arranged information processing apparatus is explained in detail, a description will be given of the general installation process that is performed.

Figure 3:
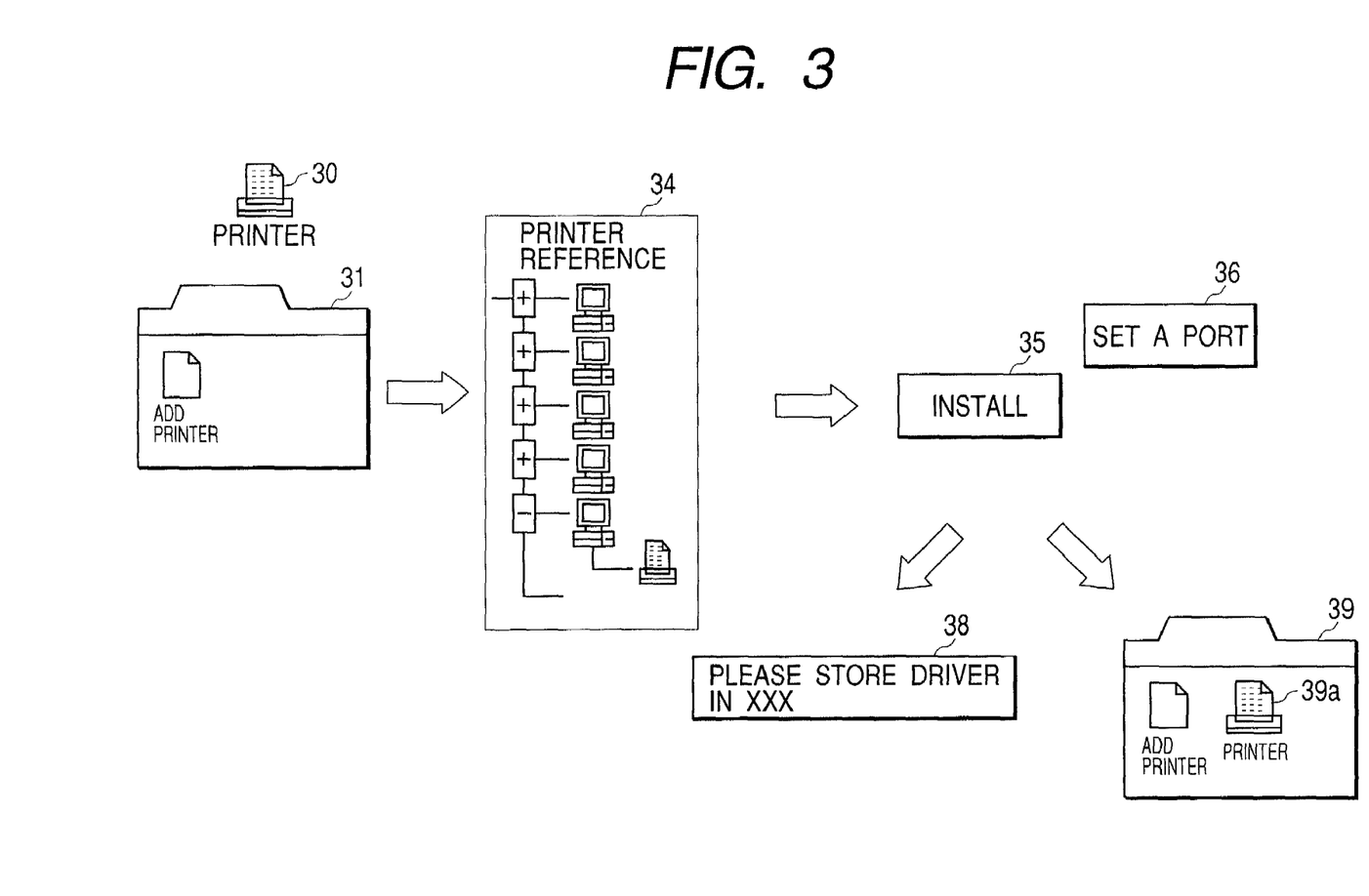
FIG. 3 is a schematic diagram for explaining the processing performed by the information processing apparatus when installing a printer object in a system.

FIG. 3 is a schematic diagram showing the process performed by the information processing apparatus when a printer object is installed in the system.

In FIG. 3, a printer object 30 is used to display a printer device that is locally connected or is used in common across a network. Generally, the search function is provided by the OS, but in the Windows OS, a PC on a network and a network connected printer are searched for by clicking on a network icon, and a printer that is found is displayed as a printer object. When the printer object 30 is to be installed on a local PC system, a specific folder 31 provided by the OS (in this embodiment, a printer folder to install a printer device) is opened, and an additional icon 31a for a printer is double-clicked on.

While the printer folder to install a printer device in use is provided by the OS, for the connection to a network of another scanner or digital camera, a specific folder is not prepared by the OS and a function must be added as a utility program.

When the printer object 31a is not present in the local machine, a device connected via a network is searched for by referring to a printer reference dialogue 34, so that an object can be designated and an installation instruction issued. The list in the printer reference dialogue 34 is prepared for display by using host names to sort the printers.

When a printer device that is connected locally to a specific host PC is set up for use in common, the printer object is hidden under the host PC object and is not specifically displayed as an icon. Thus, the (+) control is pointed at using a pointing device and is depressed (clicked on), so that the printer object can be observed by opening and displaying the list (see the printer reference dialogue 34 in FIG. 3).

Therefore, a user must expand the list in order to select a desired printer object to be installed. And when the printer object is thus selected, the user must either double-click on the selected printer object, or must drag the selected printer to and drop it on the printer folder 31, so as to begin a process 35 for installing the selected printer object. As a result of this process, a printer driver, which is a device control program (and includes a print data generation program and a dynamic link library used to notify an OS of the presence of a translatable drawing function) is installed in the local PC, so that the printer device that corresponds to the selected printer object can be used by the local PC. When the process 35 for installing the printer object, i.e., the printer driver installation process, has been completed, a printer object 39a is added to the printer folder 31 of the local PC system and is displayed (see 39 in FIG. 3).

Before the installation can be completed, a process 36 for setting an output port is required, and when a device driver (also a dynamic link library) required for the connection of an object is not found, a driver storage location 38 must be designated. In this embodiment, the driver installation process is performed as is shown in FIGS. 4 and 5.

Before the installation process can be completed, the process 36, for setting the output port, must be performed, or if a device driver (also a dynamic link library) required for the connection of an object is not found, the driver storage location 38 must be designated. On the other hand, in this embodiment, the driver installation process shown in FIGS. 4 and 5 is performed.

Figure 4:
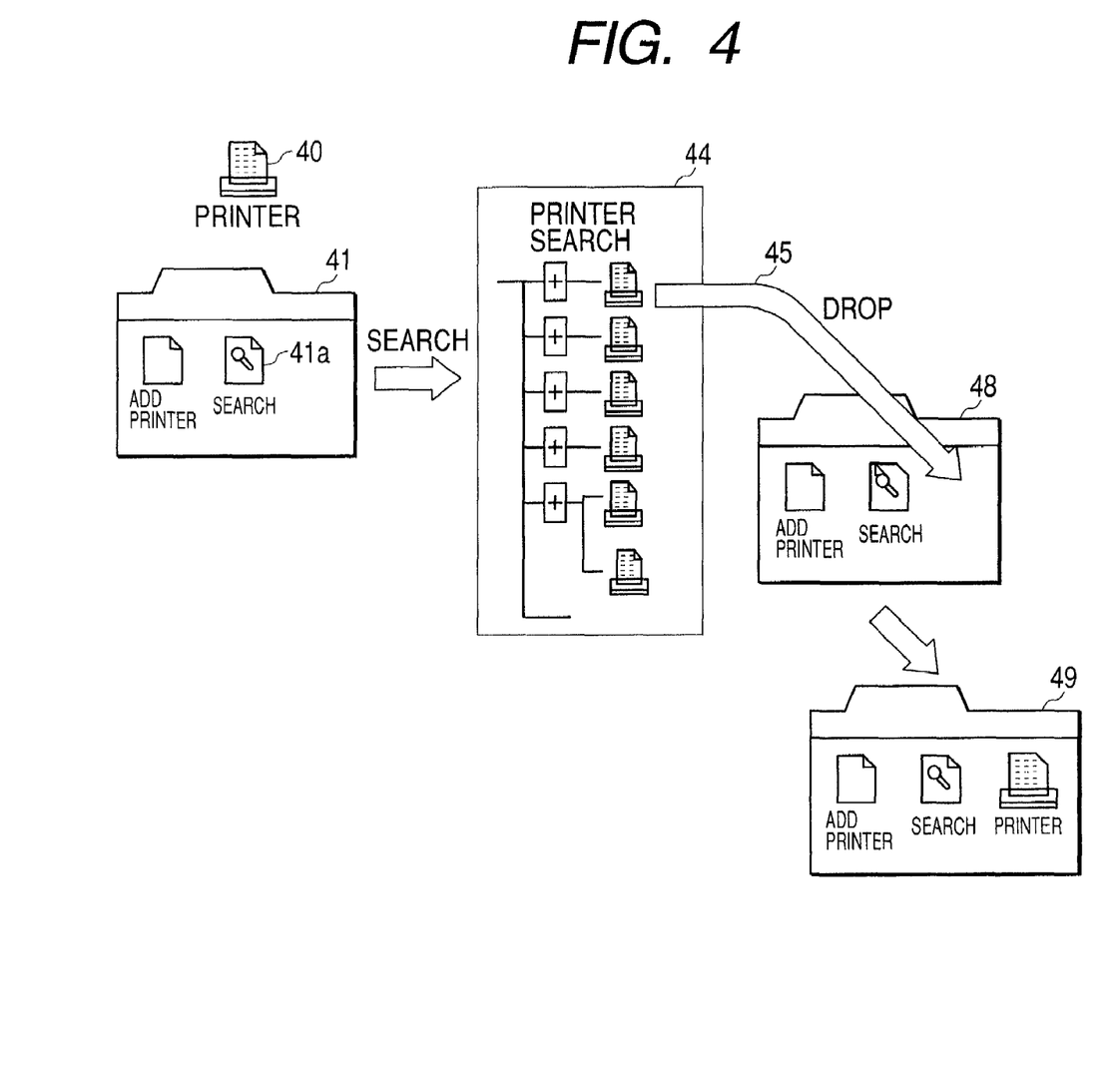
FIG. 4 is a schematic diagram for explaining the driver installation processing performed by the information processing apparatus according to the present invention.
Figure 5:
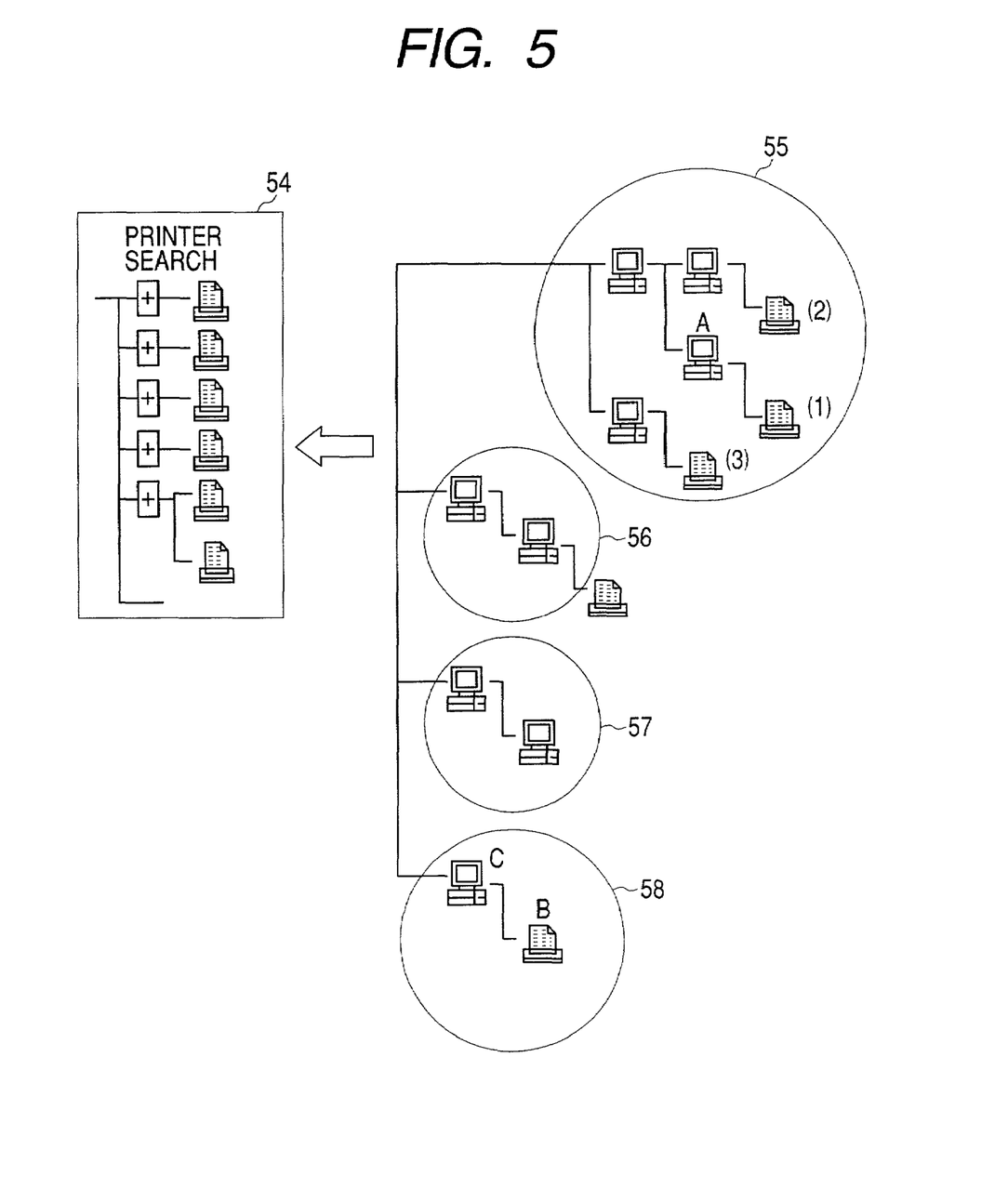
FIG. 5 is a schematic diagram for explaining the driver installation processing performed by the information processing apparatus according to the present invention.

FIGS. 4 and 5 are schematic diagrams for explaining the driver installation processing performed by the information processing apparatus according to the present invention. In FIG. 4, the state corresponds to the processing state at the time the driver is installed, and in FIG. 5, the state corresponds to the display of the list of search results.

The feature differing from the driver installation process state in FIG. 3 is that the method used for generating the displayed contents of the printer reference list differs from the display method used for the general list shown in FIG. 3.

Specifically, in the list display example in FIG. 3, host names are used to sort the printers on the list prepared for the reference dialogue 34. When a printer is set for use in common by a specific host, it is hidden under the host and is not directly displayed as an icon. Thus, to view the hidden printer, the (+) control is pointed to by the cursor, which is manipulated by a pointing device (not shown), and is depressed, and the list is opened and displayed. On the other hand, in FIGS. 4 and 5, according to the list display process of this embodiment, the printer reference lists in the printer search dialogues 44 and 54 are basically displayed as printer icons, and the printers are presented in order, beginning with the printer nearest the machine that is currently being operated. That is, when the utility program displays, on the CRT 10 (the display means), a tree structured list of printer objects detected by the detection means (the utility program that permits the CPU 1 in FIG. 1 to access the external memory 11 and detect printer objects), the utility program controls the display process so as to display, in accordance with the number of steps along a direct path to them, the printer objects that are detected by the apparatus that is currently being operated, or a local machine, which is the printer connected to the pertinent apparatus. For example, printer objects arranged as a list, in the ascending order of the number of directories that must be searched or the objects that must be tracked in order to reach a target printer object from the local apparatus, are displayed, or the local printer, which is a local object, is displayed.

The PC has been described as a preferred example information processing apparatus that comprises: a storage device (corresponding to the external memory 11 in FIG. 2), for storing predetermined objects for predetermined devices based on the directory information; detection means (the CPU 1 in FIG. 2 accesses the external memory 11 to perform the detection process), for detecting a specific object from the directory information read from the storage device; display means (corresponding to the CRT 10 in FIG. 2), for displaying, in a tree structured list, the specific objects detected by the detection means; and control means (corresponding to the utility program that permits the CPU 1 in FIG. 2 to control the display of objects on the CRT 10), for controlling the display, on the display means, of the tree structured list of the objects detected along the directory path by the detection means, beginning with the object nearest the local object.

That is, according to the embodiment, the path up to the printer object is hidden by the (+) control, and in order to find a printer, the manipulation of the pointing device (not shown) and the use of the cursor to designate the target printer are not required. In other words, the utility program (control means), when displaying the printer object, performs the display process in such a way that the intermediate directory path leading to the object that is displayed is eliminated.

Therefore, since the list display process in FIGS. 4 and 5 does not require that an operation to depress the (+) control be performed until the required printer object is reached in the list in FIG. 3, and since no scrolling operation is required to search for the host name, the processing can be simplified.

According to the present invention, since a printer search icon 61a is prepared for the printer folder, a function can be provided that permits a user who desires to install a specific printer object to search for the desired printer device.

Specifically, in FIG. 4, when a printer object 40 is to be installed in the system, a specific folder (a printer folder in this embodiment) 41 is opened, and while a pointing device (not shown) is used to point to a search icon, the left button (not shown), for example, of the pointing device is used to double-click on the icon.

Then, after the search process for the printer device has been initiated, the attributes of the printer devices that are found are obtained. And thereafter, when the search process has been completed, a dialogue for displaying a list of the search results is generated and is displayed as a printer search dialogue 44 on the CRT 10, the display means.

Basically, printer icons are employed for the display of the list presented using the printer search dialogue 44, and the printers are displayed in order, beginning with the printer nearest the machine that is currently being operated.

The path up to the printer object is hidden by the (+) control, and the depression and designation process using the pointing device is not required to find the desired printer. At this time, assuming that a modeless relationship is established between the search results dialogue and the printer folder, the installation can also be started while an instruction 45 for dropping the printer icon displayed on the CRT 10 into a folder 48 is regarded as the double-clicking process performed for the additional icon of the printer.

When the installation is completed in this manner, the printer object is added to a printer folder 49. Since the directory structure information is present in the installation process in FIG. 4, so long as printer access rights are obtained, the associated port setting process can be automatically performed.

During the process performed for displaying the search list in accordance with the embodiment, as is shown in FIG. 5, a search results display list 54 is prepared. In this case, methods 55 to 58, for processing the directory information obtained from the system, are employed.

In FIG. 5, when the directory structure in the portion enclosed by a circle for the method 55 is employed to process the directory information obtained from the system, printers on the search results display list are arranged in the order (1), (2) and (3) if the user information processing apparatus (machine) is regarded as machine A in FIG. 5.

The printers are displayed beginning with the printer at the shortest distance (at the nearest location) from the machine A along the directory node. Since the nearest printer, which it is comparatively probable will be installed in the machine A, is located at the head of the list, required operations, such as scrolling, can be reduced.

Further, as is shown in FIG. 5, the node in a portion 56 enclosed by a circle is removed when it is not directly related to the user's operation. Only when the user must refer to the direct path must he or she designate the (+) control with a cursor by manipulating a pointing device, and click on and open the (+) control.

A directory in a portion 57, enclosed by a circle, that does not include printer objects is not a target to be displayed.

When, as is shown in a portion 58, enclosed by a circle, the printer object B can not be directly referred to by the user of the machine A due to the access right relationship, the object C that has no higher access right problem is added to the list.

When the forms of the displayed icons differ in accordance with the access rights, on a list, a user can distinguish between a printer that can be accessed comparatively freely and one for which access is limited for security reasons.

Conventionally it frequently happens that after the (+) control has been designated by a cursor manipulated by the pointing device (not shown), or after the (+) control has been clicked on, the process for the display of the access rights message is canceled. In this embodiment, the probability that the above user operation will fail can be considerably reduced.

Figure 6:
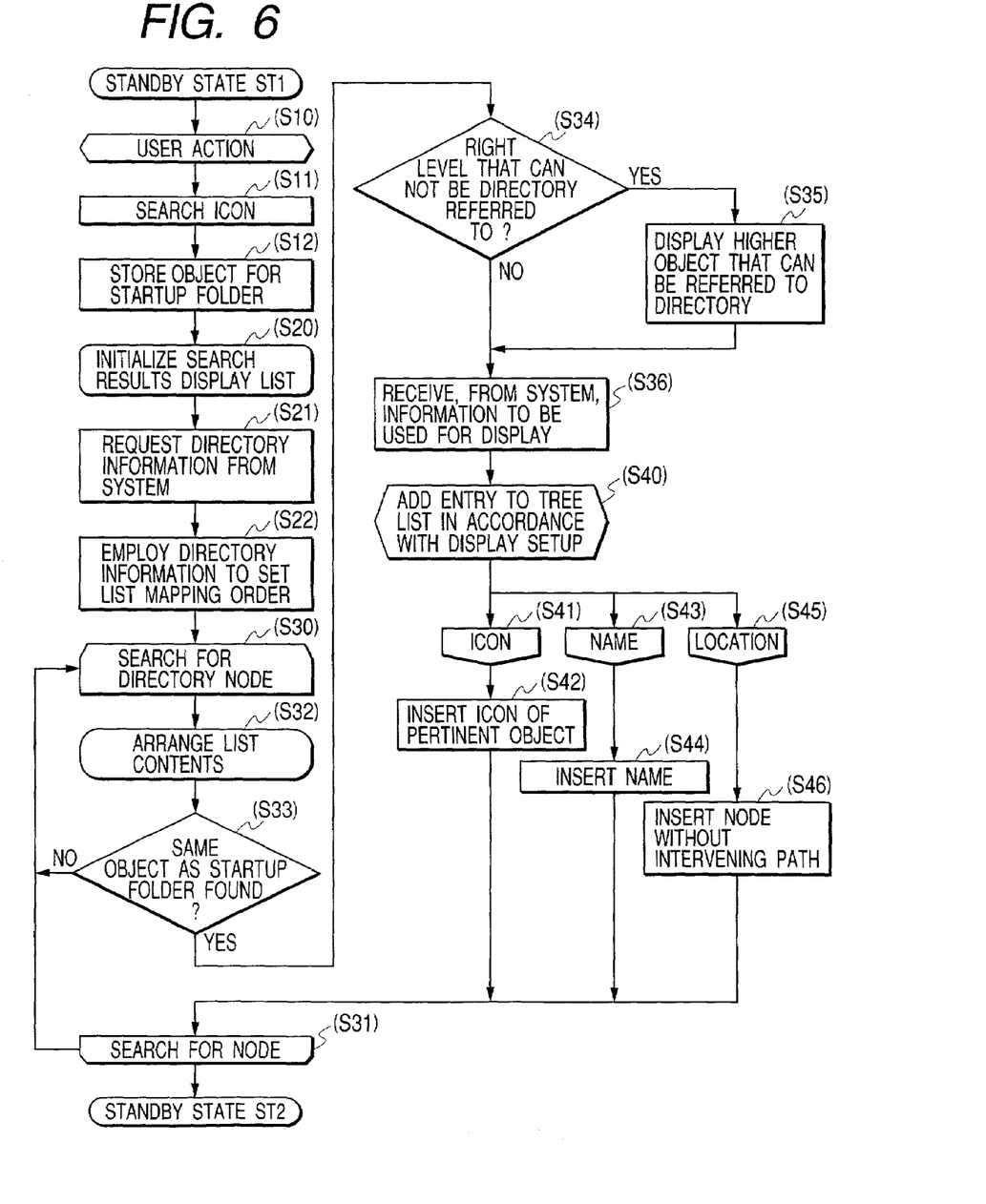
FIG. 6 is a flowchart showing the data processing performed by the information processing apparatus according to the present invention.

FIG. 6 is a flowchart for the data processing performed by the information processing apparatus according to the invention. This processing is the detailed processing performed for the display of the device list at the device installation time in FIGS. 4 and 5. S10 to S12, S20 to S22, S30 to S36 and S40 to S46 designate the individual steps.

First, in the standby state ST1 an action is entered from a user (S10), and the search icon 41a in FIG. 4 is selected by manipulating the pointing device (not shown) (S11) Then, the target object of the startup folder is stored in a predetermined area of the RAM 2 (S12), and program control moves to the process for the search results display list (S20).

First, directory information is requested from the system (OS) (S21), and the order for the insertion of items in the list is set (S22). Then, in accordance with the order, the loop (steps S30 and S31) is entered to search the directory node for a target object (S30).

In the loop, the contents to be inserted in the list are arranged (S32). When the same object type as a startup folder that is stored at step S12 is found (S33), the CPU 1 determines whether this object is at an access right level that can not be referred to (S34). When the decision is Yes, a higher object that can be directly referred to is determined to be the one that will be used for the display contents (S35). However, when the object that is found during the search can be referred to directly, this object is regarded as the one to be used for the display contents. Then, information for the thus determined displayed object is obtained (S36) and is added to the list (S40).

At this time, when the display of an icon has been set (S41), the icon representing the pertinent object is inserted in the list (S42). Subsequently, after the name of the object for the display has been set (S43), it is inserted into the list (S44). And when the display of a location has been set (S45), a node is inserted by eliminating the intermediate path (S46).

This processing is repeated until it is ascertained that the node object search has been completed (S31).

This embodiment of the invention can also be applied for a change in the location at which directory information is obtained, a change in a data merging method used to generate a tree list using directory information, the removal of a user action and a location change, and a change in the order in which process units are arranged.

This embodiment, instead of being applied for the processing of a single object, such as a printer, can be applied for the processing of multiple objects, such as a printer and a facsimile machine for which the functions differ (attributes).

Figure 7:
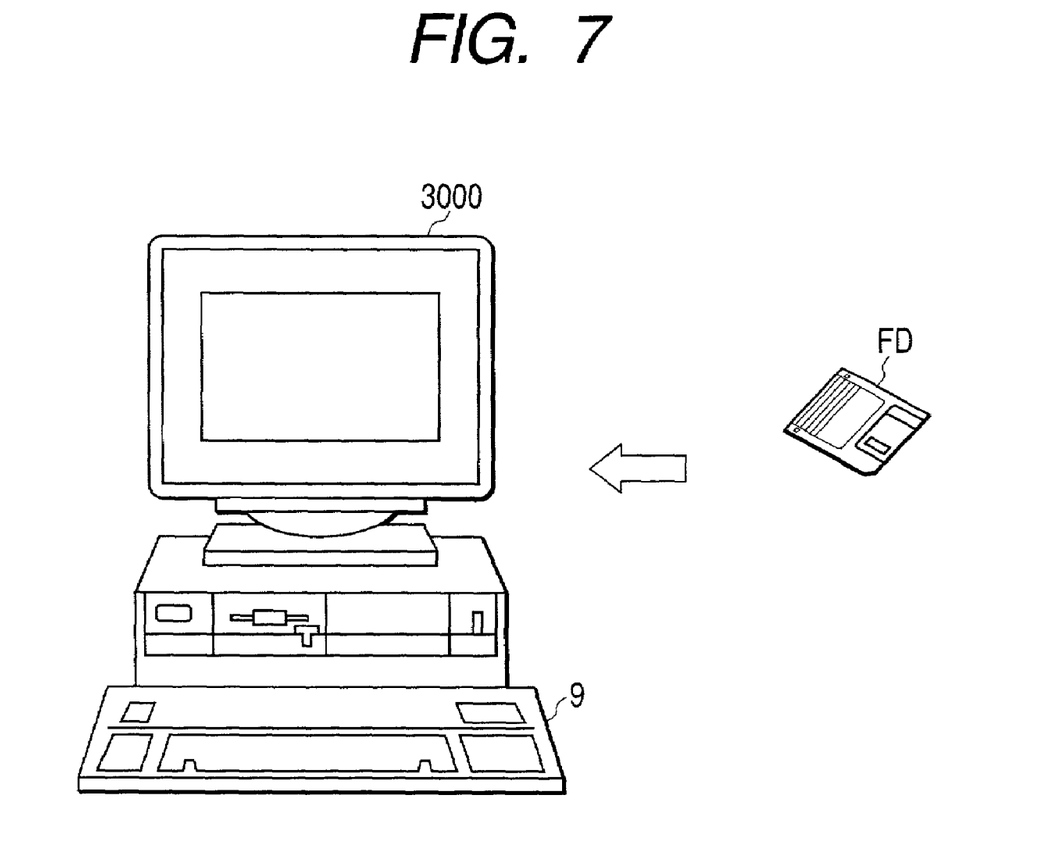
FIG. 7 is a diagram showing an example program supply medium for the information processing apparatus according to the present invention.

FIG. 7 is a diagram showing the process for supplying a program to the information processing apparatus of the present invention. The same reference numerals as are used in FIG. 1 are used to denote corresponding components.

In FIG. 7, when a floppy disk FD, a storage medium, is inserted into a host computer, the information processing apparatus 3000, a program (program code corresponding to the steps in FIG. 6) is read from the floppy disk FD and loaded into the information processing apparatus 3000, and is written in the external memory 11.

While referring to a memory map in FIG. 8, an explanation will be given for the structure of a data processing program that can be read by the information processing apparatus 3000 of the invention.

Figure 8:
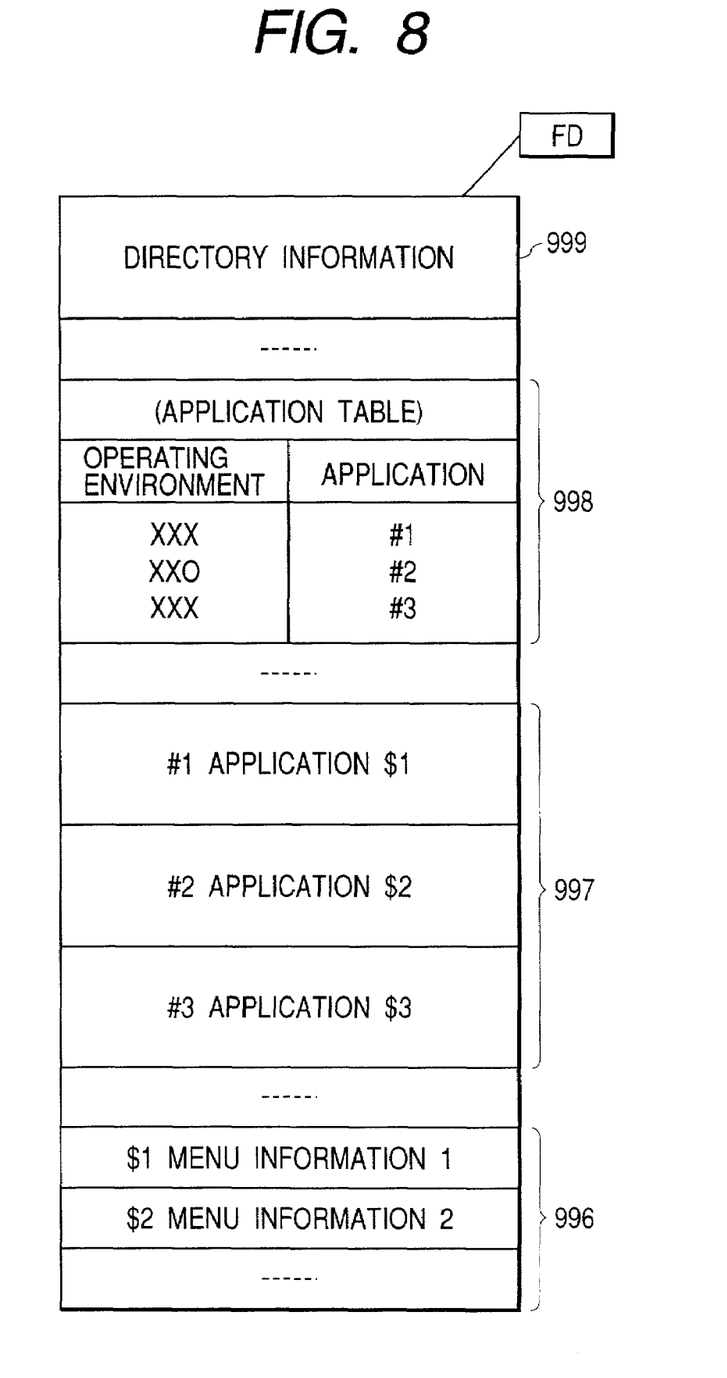
FIG. 8 is a diagram for explaining the memory map for a storage medium on which are stored various data process programs that can be read by the information processing apparatus of the invention.

FIG. 8 is a diagram for explaining the memory map for a storage medium on which are stored various data processing programs that can be read by the information processing apparatus 3000 of the invention.

Although not specifically shown, information, such as version information and creator information, for managing the programs on the storage medium is also stored thereon, as is information that is relevant to the OS on the program reading side, such as the icons displayed for the separate programs.

In addition, applicable data for the various programs are also managed in the directory. And furthermore, programs may also be stored for installing various programs in a computer and for decompressing compressed programs that are to be installed.

In this embodiment, the function in FIG. 6 may be performed by a host computer using the program that is externally installed. The present invention can also be applied in a case wherein an information group, including a program, to be loaded in an output device is supplied by using a storage medium, such as a CD-ROM or a flash memory, or is supplied, via a network, by an external storage medium.

As is described above, the objective of the invention can also be achieved by supplying to a system, or an apparatus (or a CPU or an MPU), a storage medium on which is recorded software program code that implements the functions of the embodiment, and by permitting the system or the apparatus to read and execute the recorded program code.

In this case, the program code read from the storage medium provides the new functions of the invention, and the storage medium on which the program code is recorded constitutes the present invention.

The storage medium used for supplying the program code can be, for example, a floppy disk, a hard disk, an optical disk, a magneto-optical disk, a CD-ROM, a CD-R, a magnetic tape, a nonvolatile memory card, a ROM, or an EEPROM.

In addition, with the present invention it is not only possible for the functions of the preceding embodiment to be provided through the execution of program code by a computer, but also, the program code can interact with an OS running on the computer, or with another software application, to provide the functions described in the above embodiment.

Furthermore, with the present invention, program code, read from a storage medium, can be written in a memory that is mounted on a function expansion board inserted into a computer, or in a function expansion unit connected to the computer, and in consonance with instructions in the program code, a CPU mounted on the function expansion board, or in the function expansion unit, can perform part or all of the actual processing required to implement the functions of the above described embodiment.

In FIG. 8, the storage location of an application program 998 is recorded in an area 999 for storing directory information. Further, a storage area 997 for the control program shown in FIG. 6, and a storage area 996 for configuration information used for the processing are also defined.

The operator of the host computer 3000 refers to the contents of the floppy disk FD and employs the KB 9 to designate, for example, the name of an application to be installed, and by referring to the table 998 the host computer 3000 can load the designated application. When, for example, the operating environment XXX is designated, the corresponding application and configuration information stored in the areas 997 and 996 are loaded into the host computer 3000.

According to the embodiment, the operations that must be performed before an object is reached by tracking the tree list can be considerably reduced. Further, since an object it appears a user frequently employs can be positioned at the top of the list, and since the display of objects varies in accordance with user access right levels, a user interface can be provided that can be easily manipulated.

The present invention may be applied for a system constituted by multiple apparatuses (e.g., a host computer, an interface, a reader and a printer), or for a single apparatus (e.g., a copier or a facsimile machine).

As is described above, according to the invention, when a specific object is detected in the directory information that is read from a storage device, the object display operation is controlled so as to display a specified object at a higher location on a tree list. Since the operation required to display a specific object desired by a user can be considerably simplified, and since the specific device can be displayed at an optimal location for the user, a useful interface can be provided.

What is claimed is:

1. An information processing apparatus comprising:
 a storage device, for storing predetermined objects for the printing devices based on directory information including a tree list;
 first display means for displaying a printer folder for printer management, the printer folder including a search icon;
 designation means for designating the search icon included in the printer folder displayed by said first display means;
 search means for searching for a plurality of printing devices provided on a network in response to a designation made by said designation means;
 detection means, for detecting specific objects in the directory information read from said storage device, the specific objects including at least a first specific object corresponding to a first one of the plurality of printing devices found by said search means and a second specific object corresponding to a second one of the plurality of printing devices found by said search means;
 second display means, for displaying, in accordance with the tree list, the specific objects detected by said detection means;
 control means, for permitting said second display means to display, in accordance with the tree list, the specific objects detected by said detection means, such that the first specific object is displayed in the tree list with a higher display priority than the second specific object if a number of other information processing apparatuses which exist between the first printing device and said information processing apparatus is smaller than a number of other information processing apparatuses which exist between the second printing device and said information processing apparatus; and
 discrimination means for discriminating, for each of the specific objects detected by said detection means, whether the specific object has a display right,
 wherein said control means permits said second display means to display the specific objects such that if said discrimination means discriminates that a certain specific object does not have a display right, a specific object having a display right and a higher display priority than the certain specific object is displayed.

2. An information processing apparatus according to claim 1, wherein said control means performs sorting for an object display, so that the specific objects are displayed at a higher location on a list.

3. An information processing apparatus according to claim 1, wherein the specific objects include an object for a printer device.

4. An information processing apparatus according to claim 1, wherein the specific objects include an object for a compound device including a printer function.

5. An information processing method, for an information processing apparatus including a storage device for storing predetermined objects for the printing devices based on directory information including a tree list, said method comprising:
 a first display step of displaying a printer folder for printer management, the printer folder including a search icon;
 a designation step of designating the search icon included in the printer folder displayed in said first display step;
 a search step of searching for a plurality of printing devices provided on a network in response to a designation made in said designation step;
 a detection step of detecting specific objects in the directory information read from the storage device, the specific objects including at least a first specific object corresponding to a first one of the plurality of printing devices found in said search step and a second specific object corresponding to a second one of the plurality of printing devices found in said search step;
 a second display step of, in accordance with the tree list, displaying on display means the specific objects detected in said detection step;
 a control step of permitting the display means to display, in accordance with the tree list, the specific objects detected in said detection step, such that the first specific object is displayed in the tree list with a higher priority than the second specific object if a number of other information processing apparatuses which exist between the first printing device and the information processing apparatus is smaller than a number of other information processing apparatuses which exist between the second printing device and the information processing apparatus; and
 a discrimination step of discriminating, for each of the specific objects detected by said detection means, whether the specific object has a display right,
 wherein said control step includes permitting execution of said second display step to display the specific objects such that if, in said discrimination step, it is discriminated that a certain specific object does not have a display right, a specific object having a display right and a higher display priority than the certain specific object is displayed.

6. An information processing method according to claim 5, wherein sorting for an object display is performed in said control step, so that the specific objects are displayed at a higher location on a list.

7. An information processing method according to claim 5, wherein the specific objects include an object for a printer device.

8. An information processing method according to claim 5, wherein the specific objects include an object for a compound device including a printer function.

9. A computer-readable medium storing a control program, which is executed by an information processing apparatus including a storage device for storing predetermined objects for the printing devices based on directory information including a tree list, said program comprising code for the following steps:

- a first display step of displaying a printer folder for printer management, the printer folder including a search icon;
- a designation step of designating the search icon included in the printer folder displayed in said first display step;
- a search step of searching for a plurality of printing devices provided on a network in response to a designation made in said designation step;
- a detection step of detecting specific objects in the directory information read from the storage device, the specific objects including at least a first specific object corresponding to a first one of the plurality of printing devices found in said search step and a second specific object corresponding to a second one of the plurality of printing devices found in said search step;
- a second display step of, in accordance with the tree list, displaying on display means the specific objects detected in said detection step;
- a control step of permitting the display means to display, in accordance with the tree list, the specific objects detected in said detection step, such that the first specific object is displayed in the tree list with a higher priority than the second specific object if a number of other information processing apparatuses which exist between the first printing device and the information processing apparatus is smaller than a number of other information processing apparatuses which exist between the second printing device and the information processing apparatus; and
- a discrimination step of discriminating, for each of the specific objects detected in said detecting step, whether the specific object has a display right, wherein said control step includes permitting execution of said second display step to display the specific objects such that if, in said discrimination step, it is discriminated that a certain specific object does not have a display right, a specific object having a display right and a higher display priority than the certain specific object is displayed.

10. A computer-readable medium according to claim 9, wherein execution of said code for a control step is done such that sorting for an object display is performed, and the specific objects are displayed at a higher location on a list.

11. A computer-readable medium according to claim 9, wherein the specific objects include an object for a printer device.

12. A computer-readable medium according to claim 9, wherein the specific objects include an object for a compound device including a printer function.

* * * * *